United States Patent
Yamaoka

(10) Patent No.: US 8,122,279 B2
(45) Date of Patent: Feb. 21, 2012

(54) MULTIPHASE CLOCKING SYSTEMS WITH RING BUS ARCHITECTURE

(75) Inventor: Hiroaki Yamaoka, Austin, TX (US)

(73) Assignee: Kabushiki Kaisha Toshiba, Tokyo (JP)

( * ) Notice: Subject to any disclaimer, the term of this patent is extended or adjusted under 35 U.S.C. 154(b) by 905 days.

(21) Appl. No.: 12/106,874

(22) Filed: Apr. 21, 2008

(65) Prior Publication Data

US 2009/0265498 A1 Oct. 22, 2009

(51) Int. Cl.
- G06F 1/00 (2006.01)
- G06F 1/04 (2006.01)
- G06F 1/14 (2006.01)
- G06F 1/24 (2006.01)
- G06F 11/00 (2006.01)
- G06F 1/12 (2006.01)
- G06F 5/06 (2006.01)

(52) U.S. Cl. ........ 713/600; 713/500; 713/501; 713/502; 713/503

(58) Field of Classification Search ............... 713/1, 500, 713/501, 502, 503, 600
See application file for complete search history.

(56) References Cited

U.S. PATENT DOCUMENTS

| | | | | |
|---|---|---|---|---|
| 5,555,540 | A | * | 9/1996 | Radke ............... 370/462 |
| 5,659,781 | A | * | 8/1997 | Larson ............... 712/11 |
| 6,504,854 | B1 | * | 1/2003 | Hofmann et al. ....... 370/518 |
| 6,983,387 | B2 | * | 1/2006 | Boerstler et al. ...... 713/322 |
| 2006/0041715 | A1 | * | 2/2006 | Chrysos et al. ........ 711/110 |
| 2008/0141062 | A1 | | 6/2008 | Yamaoka |

OTHER PUBLICATIONS

Pham, D., "Overview of the Arch, Circuit Design, and Physical Implementation of a First-Gen Cell Processor", IEEE Jrnl Solid-State Circuits, vol. 41 No. 1 pp. 179-196 Jan. 2006.

* cited by examiner

*Primary Examiner* — Thomas Lee
*Assistant Examiner* — Samantha Hoang
(74) *Attorney, Agent, or Firm* — Law Offices of Mark L. Berrier

(57) ABSTRACT

Systems and methods for transferring data using a ring bus architecture in a system that implements multi-phase clocking. In one embodiment, the system is a multiprocessor having multiple processor cores coupled to the ring bus. The bus may be a bidirectional bus having a first data path on which data is transferred in a clockwise direction and a second data path on which data is transferred in a counterclockwise direction. Controllers within the processor cores provide phase-shifted signals to the latches to clock data into them. Data transfers on the bus may be controlled by an arbiter which is coupled to the processor cores' controllers. The arbiter may schedule data transfers on the bus based on data transfer speeds associated with left-to-right and right-to-left data transfer directions. The arbiter may cause the phases of the clock signals to be selectively varied, or may cause the clock signals to be gated.

13 Claims, 4 Drawing Sheets

MULTIPHASE CLOCKING SYSTEMS WITH RING BUS ARCHITECTURE

BACKGROUND

1. Field of the Invention

The invention relates generally to systems and methods for transferring data in a multiprocessor system, and more particularly to systems and methods for transferring data using a ring bus architecture in a system that implements multiphase clocking.

2. Related Art

When integrated circuits such as processors are operated, they draw current from a power source. The logic components within an integrated circuit typically operate based on a clock signal, so the current drawn by the integrated circuit may suddenly increase at certain points in the clock cycle (e.g. at the rising edge of each clock cycle.) The high rate of change of the current (high di/dt) may cause electromagnetic interference (EMI) and/or noise in the power supply. Both EMI and power supply noise are undesirable.

Reducing EMI and power supply noise is becoming more and more important in designing electronic systems. This is true for a number of reasons. For instance, because it is desirable to increase the number of operations that can be performed by processors in a given amount of time, clock frequencies are increasing. The increased clock frequencies make the processors more susceptible to EMI and power supply noise. It is also desirable to design integrated circuits to use less power, so power supply voltages are decreasing. These decreased power supply voltages also make the integrated circuits more susceptible to EMI and power supply noise. Still further, because it is desirable to increase computational power, processors may include multiple processor cores, each of which contributes to di/dt and thereby creates more noise and EMI.

In some multiprocessor systems, it has been proposed to implement multiphase clock schemes (see U.S. Patent Application Pub. No. 20080141062; Ser. No. 11/609,794.) In these systems, the different processor cores operate on clock signals that have different phases. By shifting the phases of the clock signals with respect to each other, di/dt can be reduced. This reduction in di/dt, however, is obtained at the cost of added complexity in the system's implementation. One complication that arises from the use of multiphase clocking relates to the transfer of data among the processor cores.

Multiprocessor systems often use a ring bus architecture to transfer data between the different processor cores because of the simplicity and scalability of such an architecture. In a ring bus architecture, each processor core is connected to a circular (ring) bus. Data can be put on the bus by an originating processor core, and the data circulates around the ring until it reaches a destination processor core which reads the data off the bus. Some ring bus architectures include a first ring (data path) which enables the clockwise circulation of data and a second ring which enables counterclockwise circulation of data. These bidirectional ring bus architectures have not previously been implemented in systems that use multiphase clocking for elements of the bus and/or interfaces to the bus. One reason for this is that the different clock signals used by the different processor cores may not allow enough time for data to be reliably transferred around the ring, particularly in both clockwise and counterclockwise directions.

It would therefore be desirable to provide systems and methods for implementing a bidirectional ring bus architecture in a system such as a multiprocessor that uses multiphase clocking.

SUMMARY OF THE INVENTION

One or more of the problems outlined above may be solved by the various embodiments of the invention. Broadly speaking, the invention includes systems and methods for transferring data using a ring bus architecture in a system that implements multiphase clocking.

One embodiment comprises a system having a plurality of digital circuit components coupled to a ring bus. The bus includes a plurality of latches, each of which is coupled to a corresponding one of the digital circuit components so that the digital circuit components can transmit and receive data on the bus. The system has a timing system which is configured to generate phase-shifted clock signals that are provided to the digital circuit components. The phase-shifted clock signals are used to clock data into the latches that couple the corresponding digital circuit components to the bus.

In one embodiment, the system is a multiprocessor having multiple processor cores coupled to the ring bus. The bus may be a bidirectional bus having a first data path on which data is transferred in a clockwise direction and a second data path on which data is transferred in a counterclockwise direction. Controllers within the processor cores provide phase-shifted signals to the latches to clock data into them. Data transfers on the bus may be controlled by an arbiter which is coupled to the processor cores' controllers. The arbiter may schedule data transfers on the bus based on data transfer speeds associated with clockwise and counterclockwise data paths. The arbiter may cause the phases of the clock signals to be selectively varied, or may cause the clock signals to be gated.

Another embodiment comprises a method implemented in a system having a plurality of digital circuit components coupled to corresponding latches in a ring bus. The method includes generating phase-shifted clock signals, providing each of the clock signals to a different one of the digital circuit components, and clocking data into the latches of each digital circuit component based on the phase-shifted clock signals.

Another embodiment comprises a multiphase-clocked multiprocessor. The multiprocessor includes a timing system which is configured to generate phase-shifted clock signals at a single clock frequency. The clock signals are each provided to a different one of the processor cores. The processor cores are coupled to a ring bus through corresponding latches. Each of the latches is clocked by the clock signal of the associated processor core, and data is transferred between consecutive latches on the bus in less than one period of the clock signals.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
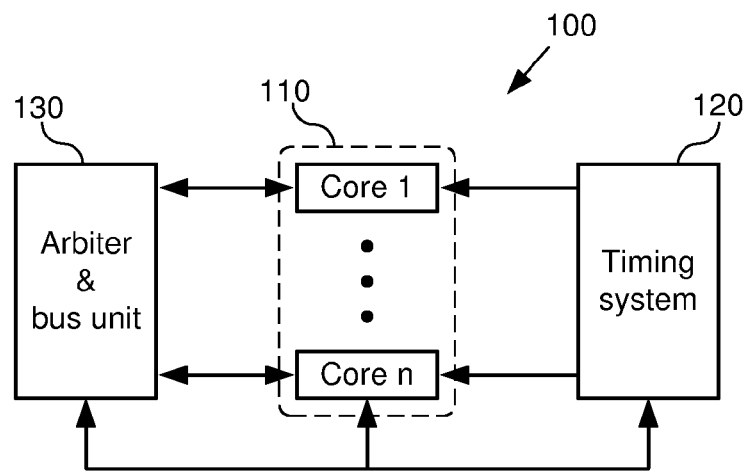
FIG. 1 is a diagram illustrating a multiprocessor system in accordance with one embodiment.

While the invention is subject to various modifications and alternative forms, specific embodiments thereof are shown by way of example in the drawings and the accompanying detailed description. It should be understood that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

Broadly speaking, the invention includes systems and methods for transferring data using a ring bus architecture in a system that implements multiphase clocking.

One embodiment comprises a multiprocessor system. The system includes multiple processor cores that are implemented on a single integrated circuit die. Each of the processor cores is coupled to a bus that enables the transfer of data and instructions to and from each of the processor cores. An arbiter is coupled to the bus and the processor cores to control the transfer of instructions and data over the bus.

A timing system is coupled to each of the processor cores and to the arbiter. The timing system provides clock signals to each of these components of the system. The timing system is configured to skew or stagger the clock signals which are provided to the processor cores so that each processor core receives a clock signal which is phase-shifted in comparison to the other processor cores' clock signals. The staggering of the clock signals to the different processor cores may be referred to herein as multiphase clocking. By staggering the phases of the clock signals that are provided to the different processor cores, the system prevents the rising and falling edges of the signals from being coincident. This reduces the rate of change of current (di/dt) in the system. The phase shift of each processor core's clock signal may be fixed or variable.

The bus which is coupled to the processor cores uses a bidirectional ring architecture. This architecture essentially implements two unidirectional ring buses, one of which transfers data in a first direction and the other of which transfers data in the opposite direction. Each unidirectional ring incorporates a latch for each of the processor cores. The latch is coupled to a controller in the corresponding processor core and allows the processor core to put data on the bus or read data off the bus. Each latch is clocked by the clock signal of the corresponding processor. That is, data at the input of the latch is loaded into the latch when a pulse or signal transition (edge) occurs in the clock signal, which is applied to a clock input of the latch. Because the processor cores use different clock signals, the arbiter and the controllers in the respective processor cores are configured to take into account the phase differences between the processor cores when data or instructions are transferred on the bus.

Various embodiments of the invention will be described below. Primarily, these embodiments will focus on the implementation of a bidirectional ring bus in a multiprocessor integrated circuit. It should be noted, however, that alternative embodiments may be implemented in systems other than multiprocessors to enable communication between various components of the systems that are driven by different clock signals.

Referring to FIG. 1, a diagram illustrating a multiprocessor system in accordance with one embodiment is shown. System 100 includes a set of processor cores 110. Each of the processor cores receives a clock signal from timing system 120. The clock signal received by each processor core drives the operations of that processor core. The phase of the clock signal received by each of the processor cores is shifted from the phases of the other cores' clock signals to reduce di/dt. Each of the processor cores is also coupled to a bus that is incorporated within an arbiter and bus unit 130. Each of the processor cores is separately coupled to the arbiter and bus unit so that they can be separately controlled to transfer data on the bus. Arbiter and bus unit 130 may be configured to control the clock signals that drive the data transfers either through individual bus controllers within the processor cores, or through timing system 120.

Figure 2:
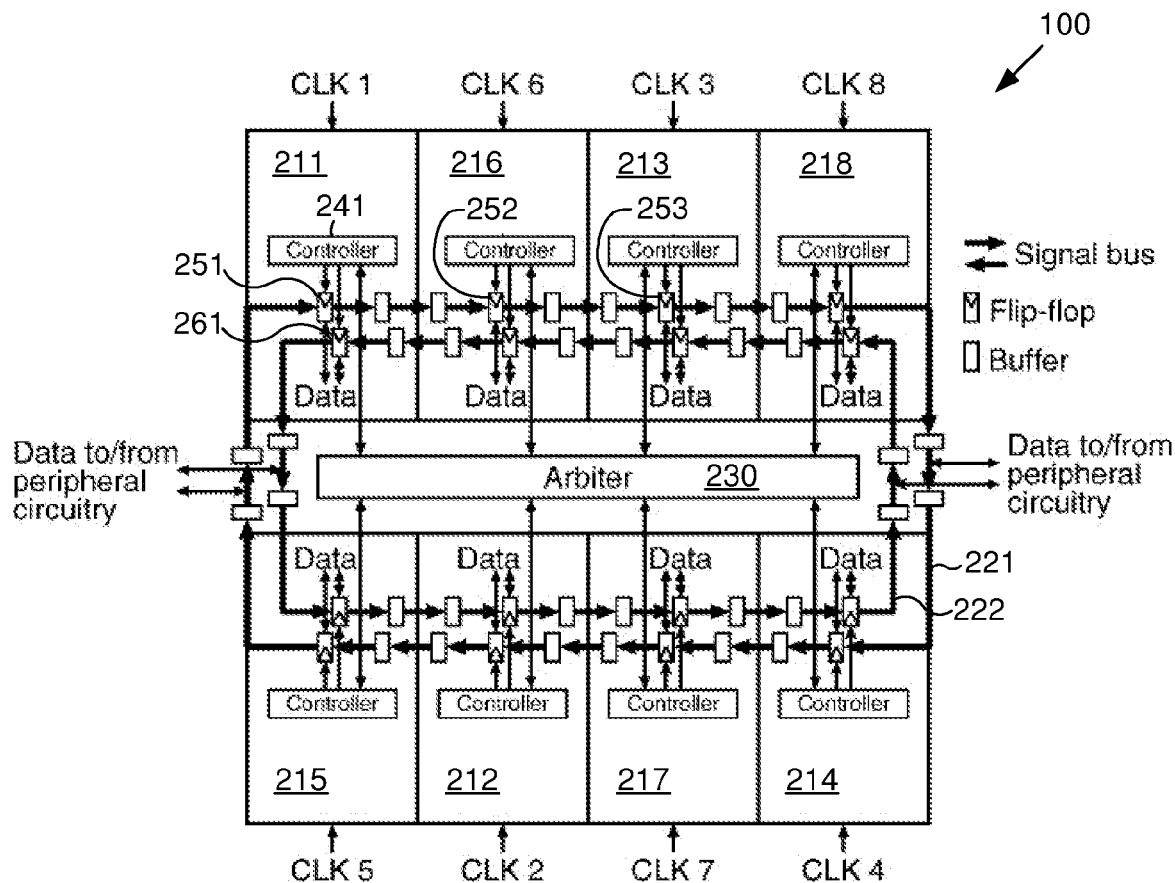
FIG. 2 is a diagram illustrating the configuration of the processor cores and arbiter/and bus unit of an exemplary system in accordance with one embodiment.

Referring to FIG. 2, a diagram illustrating the configuration of the processor cores and arbiter/and bus unit of system 100 in more detail is shown. In this embodiment, system 100 includes eight processor cores (211-218.) The processor cores communicate with each other and with peripheral circuitry through a bidirectional ring bus that includes a clockwise ring 221 and a counterclockwise ring 222. Data transfers are controlled by arbiter 230 and controllers within each of the processor cores (e.g., controller 241 within processor core 211.)

Each of processor cores 211-218 is coupled to the ring bus by a pair of latches. One of the latches couples the processor core to clockwise ring 221, while the other of the latches couples the processor core to counterclockwise ring 222. When it is desired for the processor to put data on the bus, the data is loaded into the appropriate latch (depending upon which direction the data is to be transferred) from which it is conveyed to the next latch in the ring.

For example, if processor core 211 loads data into latch 251, the data will be conveyed from latch 251 to latch 252. One or more buffers may be placed between the latches if necessary to ensure the integrity of the signal at the receiving latch. The data will then be loaded into latch 252, from which it will be transferred to latch 253, and so on. The data is thereby communicated around clockwise ring 221. Data can be transferred in the opposite direction on the ring bus by loading data into latch 261 and loading the data into successive latches in counterclockwise ring 222.

Data is read from the bus in a similar fashion. Data is communicated around rings 221 or 222 as described above. When the data reaches the latch associated with the destination processor core, the data is read from the latch by the processor core. Data can be transferred to or from peripheral circuitry via connections between the circuitry and rings 221 and 222, as shown in the figure. While the connections to the peripheral circuitry in FIG. 2 do not use separate latches, it is possible to connect this circuitry to the bus through latches in the same manner as the processor cores.

The latches may be configured in various ways. For instance, in one embodiment, the latches may be flip-flops that are designed to latch a single bit of data in a serial data stream. In another embodiment, the latches may be multiple bits wide so that larger amounts of data (e.g., bytes or words) can be transmitted simultaneously. Similarly, the buffers shown in FIG. 2 may or may not be needed, and any buffers that are needed may be configured as necessary (e.g., multiple buffers may be used) to communicate data between the latches.

Conventionally, in a multiprocessor system that uses a bidirectional ring bus, each processor core operates using the same global clock signal. The latches in the ring bus use this same clock signal, so data is transferred from one latch to another according to the pulses of this clock signal. The data is transferred around the ring, one latch per clock cycle. In a system using a multiphase clocking scheme, however, this is not the case. In a system of FIG. 2, each successive latch in the ring bus is clocked by a different clock signal, so it is necessary to configure the arbiter and controllers (which provide the clock signals to the latches) to take the timing differences into account. In the examples below, the clock signals at successive latches are skewed by approximately half of a clock cycle, so data may actually be transferred more quickly around the bus than in conventional systems. The arbiter and controllers may alternatively gate the clock signals to effectively reduce their frequencies, or they may phase-shift the clock signals to accommodate some data transfers.

Each of processor cores 211-218 receives a separate clock signal (e.g., processor core 211 receives clock signal 1, processor core 212 receives clock signal 2, and so on.) The clock signal received by a given processor core is used to drive the operation of that processor core. For example, the processor core executes instructions based on the timing of the received clock signal. The clock signals that are provided to processor cores 211-218 are illustrated in FIG. 3.

Figure 3:
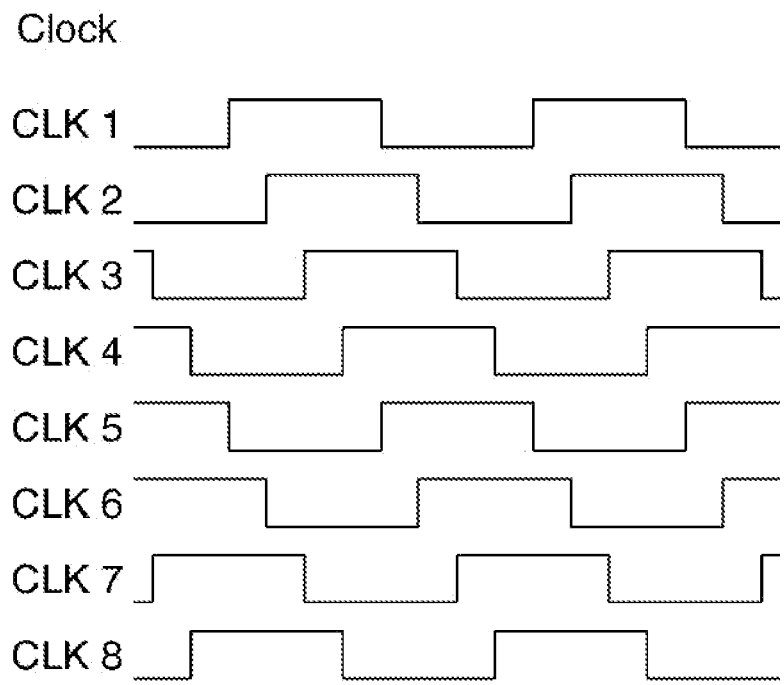
FIG. 3 is a timing diagram illustrating eight phase-shifted clock signals that are provided to corresponding processor cores in accordance with one embodiment.

Referring to FIG. 3, a timing diagram illustrating eight clock signals is shown. Each of the clock signals is provided to a different one of the processor cores shown in FIG. 2. Table 1 below shows the clock signals and the processor cores to which they are provided.

TABLE 1

| Clock signal | Processor core (see FIG. 2) |
|---|---|
| CLK 1 | 211 |
| CLK 2 | 212 |
| CLK 3 | 213 |
| CLK 4 | 214 |
| CLK 5 | 215 |
| CLK 6 | 216 |
| CLK 7 | 217 |
| CLK 8 | 218 |

It can be seen in FIG. 3 that each successive clock signal is shifted from the previous clock signal. The shift of each clock signal in this example is sufficient to evenly distribute the rising edges of the different clock signals through each clock period. Since there are eight clock signals, each clock signal is shifted by ⅛ of a clock period from the previous clock signal.

Referring again to FIG. 2, it can be seen that clock signals with successive rising edges (e.g., CLK 1 and CLK 2, or CLK 2 and CLK 3) are provided to processor cores that are not adjacent to each other. The processor cores are physically positioned as follows: from left to right at the top of the figure are cores 211, 216, 213 and 218; from left to right at the bottom of the figure are cores 215, 212, 217 and 214. Consequently, processor core 211 is fired by the rising edge of CLK 1, then processor core 212, which is non-adjacent to core 211, is fired. "Fired" is used herein to refer to the initiation of actions within the core based on the clock signal (typically the rising edge of the clock signal.)

The purpose of consecutively firing non-adjacent processor cores is to reduce the sudden demand for current in the localized area of the processor cores. When a processor core is fired, current is drawn from decoupling capacitors in the area of the processor core. If adjacent processor cores are fired consecutively, the decoupling capacitors may not have time to recharge and consequently may not be able to supply the needed current. By firing non-adjacent processor core consecutively, the firing of the second processor core draws current primarily from decoupling capacitors in a different area of the integrated circuit, thereby reducing di/dt. This is explained in more detail in U.S. Patent Application Pub. No. 20080141062 (Ser. No. 11/609,794.)

Figure 4:
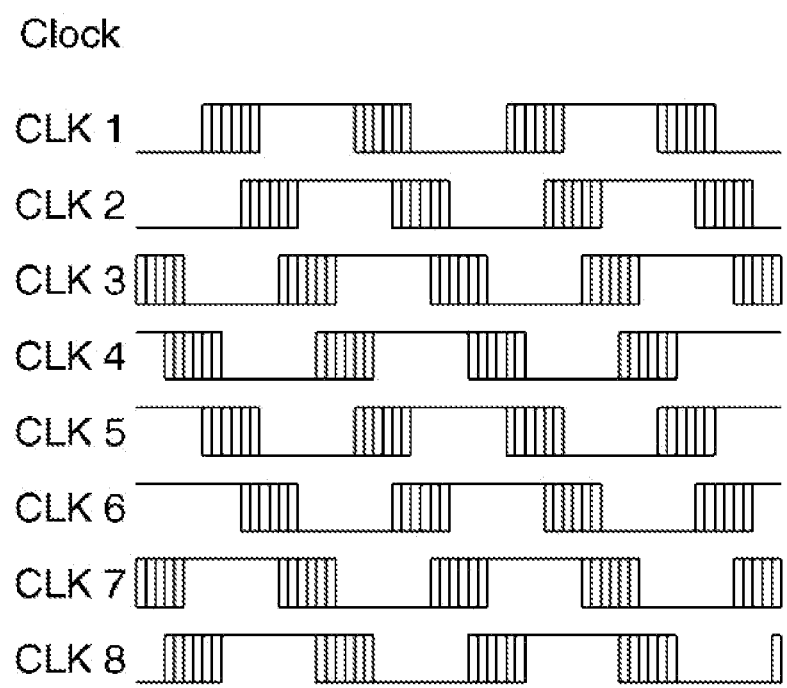
FIG. 4 is a timing diagram illustrating eight clock signals that have variable phase shifts and are provided to corresponding processor cores in accordance with an alternative embodiment.

Referring to FIG. 4, a timing diagram illustrating an alternative clocking scheme is shown. FIG. 4 again shows eight clock signals that are provided to processor cores 211-218, and the clock signals are provided to corresponding processor cores as shown in Table 1. Each of the clock signals, however, has a phase shift which is variable. The clock signals of FIG. 3, by contrast, have fixed phases. The ability to vary the phases of the clock signals may be useful in accommodating data transfers on the ring bus, as will be explained in more detail below.

Figure 5:
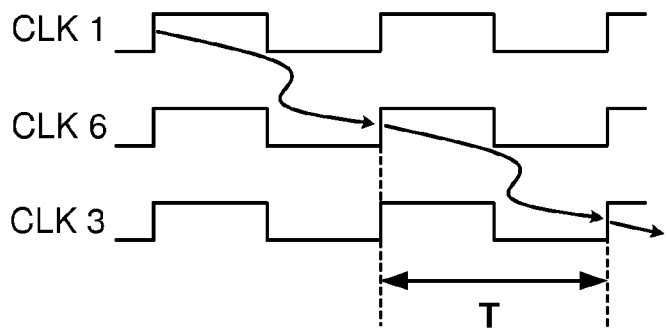
FIG. 5 is a timing diagram illustrating the transfer of data on a ring bus in a conventional multiprocessor system using a single global clock signal.

As noted above, the use of a multiphase clocking scheme in the multiprocessor complicates the transfer of data on the ring bus. Referring to FIG. 5, a timing diagram illustrating the transfer of data on a ring bus in a conventional multiprocessor system using a single global clock signal is shown. The arrangement of processor cores is assumed to be the same as shown in FIG. 2, and the correspondence of clock signals to processor cores is assumed to be as shown in Table 1. When a single clock signal is used, data on the ring bus is transferred from one latch to the next every clock cycle. This is true for every latch-to-latch transfer. The total time required for the transfer of data from an origin to a destination is m cycles, where m is the number of latch-to-latch transfers. For instance, a transfer of data from one processor core's latch to an adjacent core's latch would require one clock cycle. A data transfer to the latch of a processor core that is three cores away would require three clock cycles.

Figure 6:
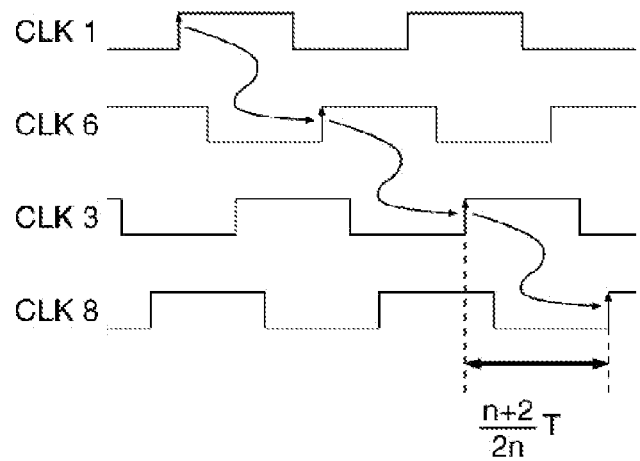
FIG. 6 is a timing diagram illustrating the left-to-right transfer of data on a ring bus in a multiphase system in accordance with one embodiment.
Figure 7:
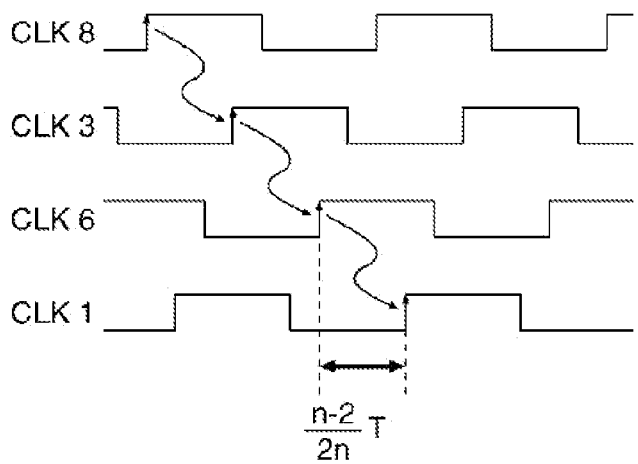
FIG. 7 is a timing diagram illustrating the right-to-left transfer of data on a ring bus in a multiphase system in accordance with one embodiment.
Figure 8:
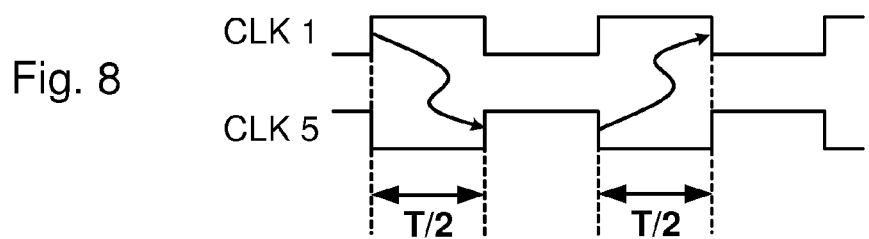
FIG. 8 is a timing diagram illustrating the transfer of data between rows of processor cores on a ring bus in a multiphase system in accordance with one embodiment.

Referring to FIGS. 6-8, timing diagrams illustrating the transfer of data on a ring bus in a multiphase system in accordance with the present system is shown. FIG. 6 illustrates data transfers in the left-to-right direction on the ring bus, while FIG. 7 illustrates data transfers in the right-to-left direction on the bus. FIG. 8 illustrates data transfers in the upward or downward directions on the bus.

Because multiphase clocking is used, the clock signals that drive adjacent processor cores and their respective latches on the ring bus are phase-shifted with respect to each other. Referring to FIG. 6, the phase shift between adjacent processor cores in the left-to-right direction is $5/4\pi$ (⅝ of a clock period.) Thus, data is transferred from one latch to the next every ⅝ of a clock cycle in this direction (i.e., 1→6→3→8 and 5→2→7→4.)

Referring to FIG. 7, the phase shift between adjacent processor cores in the right-to-left direction is $3/4\pi$ (⅜ of a clock period.) Data on the ring bus is therefore transferred from one latch to the next every ⅜ of a clock cycle in this direction (i.e., 8→3→6→1 and 4→7→2→5.)

Referring to FIG. 8, transfers of data between the two rows of processor cores (i.e., between the latches associated with processor cores 211 and 215, or cores 214 and 218) will take ½ of a clock cycle, because the clock signals provided to these processor cores are inverses of each other. The relative phase shift between them is therefore π, or ½ of the clock cycle.

The total time required for the transfer of data from an originating core's latch to a destination core's latch on the bus is dependent upon the segments of the bus that are traversed. The time required to traverse each segment (between consecutive latches on the bus) is described above for an eight-core multiprocessor. The total time can therefore be described by the equation $\frac{5}{8}x + \frac{3}{8}y + \frac{1}{2}z$, where x is the number of segments traversed in the left-to-right direction, y is the number of segments traversed in the right-to-left direction, and z is the number of segments traversed up or down between the rows of processor cores.

The time required to transfer data between latches on the ring bus is dependent upon the clock signals and the phase differences between them. The examples above are based on the use of eight processor cores and corresponding clock signals which have equal, static phase differences between consecutive signals (see FIG. 3.) This system can be scaled to accommodate more or fewer processor cores.

Figure 9:
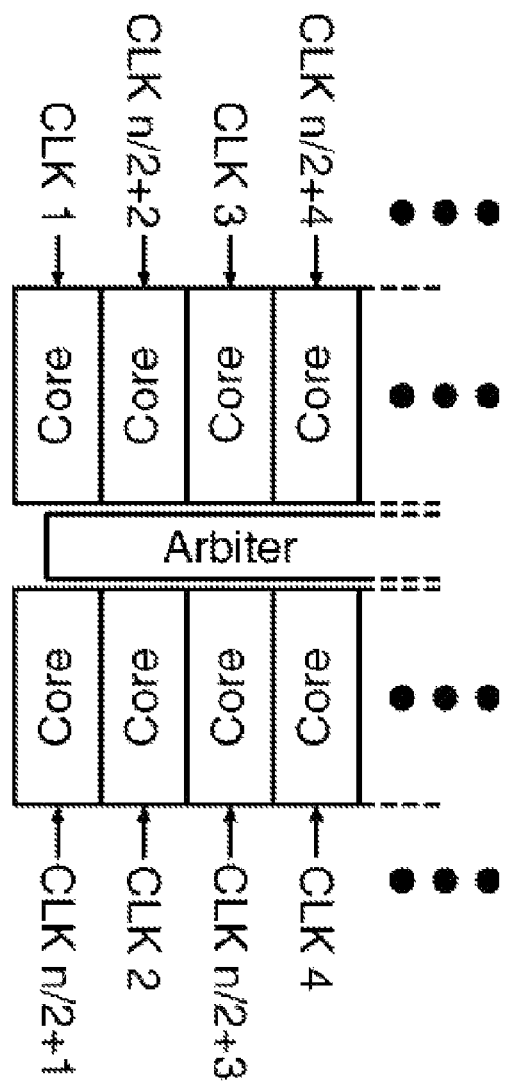
FIG. 9 is a diagram illustrating the physical layout of processor cores in a generalized multiprocessor system.

Referring to FIG. 9, a diagram illustrating the generalized physical layout of the processor cores is shown. In this figure, the processor cores form two rows which are on opposite sides (top and bottom) of the arbiter. Clock signals are provided to the processor cores so that after a particular ("first") processor core is fired, the next ("second") processor core to be fired will be in the row on the opposite side of the arbiter from the first core. The next ("third") processor core to be fired will be in the same row as the first processor core, but it will not be adjacent to the first processor core. Instead, there will be one processor core between the first and third cores. The order in which the processor cores will be fired is indicated by the numbering of the clock signals in the figure, where n is the number of processor cores in the system.

It can be seen that a system which includes a number, n, of processor cores will have n different clock signals. Each successive clock signal will have a phase difference of $2\pi/n$ from the preceding and following clock signals. Assuming the ordering described above in connection with FIG. 9, the amount of time required to transfer data from one latch to the next in the ring bus can be described in terms of the number of processors. For left-to-right transfers, the latch-to-latch transfer time between adjacent processor cores will be $((n+2)/2n)*T$, where T is the period of the clock signals. For right-to-left data transfers, the latch-to-latch transfer time will be $((n-2)/2n)*T$. Thus, as the number of processor cores increases, the latch-to-latch transfer time approaches T/2, for both left-to-right and right-to-left transfers. In both directions, the time required to transfer data from one row to another (e.g., between core 1 and core (n/2)+1) will be T/2.

It is therefore apparent that the use of multiphase clocking of the processor cores and associated bus latches as described above reduces the amount of time which is required to transfer data around the ring bus. In the case of left-to-right data transfers in the eight-core system, the transfer time is reduced by more than 35%. For right-to-left data transfers in this system, the time is reduced by more than 60%.

This shortened data transfer time may be advantageous because the processors may not have to wait as long for data as in conventional systems. This is true, however, only if the components of the bus can support the faster data transfers. In particular, the latches of the bus which are coupled to the processor cores must have set up and hold times which are shorter than the latch-to-latch data transfer times. It should be noted that latches which will support data transfers in a conventional system that does not use a multiphase clocking scheme may not support the shorter data transfer times of the multiphase-clocked system described above.

If the components of the ring bus cannot support the faster data transfers described above for the multiphase multiprocessor, the clock signals that are provided to the latches can be modified to slow down the data transfers. For instance, the clock signals may be gated, or divided, before being provided to the latches in order to reduce the frequency of the clock signals. This function can, for example, be performed by the controllers within the processor cores, acting in conjunction with the arbiter. If the clock signals described above were divided by a factor of 2, the data transfers would take slightly longer than in a conventional system, so ring components that are sufficient to support the conventional, monophase-clocked system would be sufficient to support the multiphase-clocked system.

If the components of the ring bus are sufficient to support the faster data transfers described above, the arbiter and/or controllers within the processor cores may be configured to selectively control the clock signals for other purposes. For example, faster transfer speeds may be appropriate for high-speed data transfers, but may not be appropriate for other types of data transfers. The frequencies of the clock signals provided to the latches could, in this case, be selectively varied to accommodate the type of data being transferred.

In a conventional system, the arbiter is typically configured to control aspects of data transfers such as scheduling (e.g., based on the priorities of the respective transfers) and the origins and destinations of the transfers. In the present systems, there is a speed difference between left-to-right and right-to-left data transfers. The arbiter of the multiphase-clocked system may therefore schedule data transfers on the ring bus based in part upon the corresponding transfer speed. For instance, a right-to-left data transfer may proceed faster than a left-to-right transfer, so the right-to-left transfer may be scheduled first.

The arbiter can also be configured to vary the phases of the clock signals provided to the different processor cores in order to facilitate data transfers on the ring bus. For example, if data is to be transferred in the right-to-left direction on the bus, but it is desired to extend the latch-to-latch transfer time, the arbiter and controllers may shift the phases of the clock signals of the involved processor cores to reduce the phase difference between them and thereby lengthen the transfer time. The arbiter may also be configured to change the phase shifts of the clock signals so that the sequence in which the processor cores are fired is changed. Still further, the arbiter may be configured to selectively eliminate the phase shifts between one or more of the clock signals. For instance, the arbiter could cause the multiprocessor to alternately operate in a first, monophase clocking mode or in a second, multiphase clocking mode.

The foregoing description relates to a particular exemplary embodiment. It should be noted that many alternative embodiments are possible. These alternative embodiments may incorporate all, or only a portion of the features described above, and may have numerous variations of the above described structures, functions and features. Exemplary alternative embodiments may include, for instance, systems in which components other than processor cores are coupled to the ring bus, and in which these components and the associated latches on the ring bus are clocked using multiphase clock signals. Similarly, alternative embodiments may include more or fewer processor cores (or other components). Still further, the functions of the arbiter, controllers and timing system as described above my be incorporated into other components or may be distributed in a different manner.

Those of skill in the art will understand that information and signals may be represented using any of a variety of different technologies and techniques. For example, data, instructions, commands, information, signals, bits, symbols, and the like that may be referenced throughout the above description may be represented by voltages, currents, electromagnetic, magnetic or optical fields, and so on.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with general purpose processors, digital signal processors (DSPs), application specific integrated circuits (ASICs), field programmable gate arrays (FPGAs) or other programmable logic devices, discrete gates or transistor logic, discrete hardware components, or any combination thereof designed to perform the functions described herein.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. A system comprising:
    a plurality of digital circuit components;
    a bidirectional ring bus which includes a plurality of latches, wherein each of the latches is coupled to a corresponding one of the digital circuit components to enable the digital circuit components to transmit and receive data on the bus; and
    a timing system which is configured
        to generate a plurality of clock signals, wherein each of the clock signals is phase-shifted with respect to the remainder of the clock signals, and
        to provide each of the clock signals to a different one of the digital circuit components;
    wherein each of the latches is clocked based on the clock signal provided to the digital circuit component associated with the latch;
    wherein the system comprises a multiprocessor and the digital circuit components comprise processor cores, wherein each of the processor cores includes a controller that receives the clock signal associated with the processor core, wherein the controller is coupled to the latch associated with the processor core; and
    wherein the bidirectional ring bus has a first data path on which data is transferred in a clockwise direction and a second data path on which data is transferred in a counterclockwise direction;
    further comprising an arbiter coupled to each of the processor cores and configured to control data transfers on the bidirectional ring bus, wherein the arbiter is configured to provide the clock signals to the processor cores in a manner that causes non-adjacent ones of the processor cores to be fired consecutively, and wherein the arbiter is coupled to each controller and is configured to cause each controller to selectively modify the received clock signal and to provide the modified clock signal to the associated latch.

2. The system of claim 1, further comprising one or more peripheral components that are coupled to the bidirectional ring bus and are configured to transmit and receive data on the bus.

3. A system comprising:
    a plurality of digital circuit components:
    a bidirectional ring bus which includes a plurality of latches, wherein each of the latches is coupled to a corresponding one of the digital circuit components to enable the digital circuit components to transmit and receive data on the bus;
    a timing system which is configured
        to generate a plurality of clock signals, wherein each of the clock signals is phase-shifted with respect to the remainder of the clock signals, and
        to provide each of the clock signals to a different one of the digital circuit components; and
    an arbiter coupled to each of the digital circuit components and configured to control data transfers on the bidirectional ring bus;
    wherein each of the latches is clocked based on the clock signal provided to the digital circuit component associated with the latch.

4. The system of claim 3, wherein the arbiter is configured to schedule data transfers on the bidirectional ring bus based at least in part on data transfer speeds associated with clockwise and counterclockwise data paths of the bidirectional ring bus.

5. The system of claim 3, wherein the arbiter is configured to provide the clock signals to the digital circuit components in a manner that causes non-adjacent ones of the digital circuit components to be fired consecutively.

6. The system of claim 3, wherein the arbiter is configured to cause the phase of each of the clock signals to be selectively varied.

7. The system of claim 3, wherein the arbiter is configured to cause each of the clock signals to be selectively gated.

8. The system of claim 3, wherein each of the digital circuit components includes a controller that receives the clock signal associated with the digital circuit component, wherein each controller is coupled to the latch associated with the digital circuit component, and wherein the arbiter is coupled to each controller and is configured to cause the controller to modify the clock signal received by the controller and to provide the modified clock signal to the associated latch.

9. A method implemented in a system having a plurality of digital circuit components coupled to corresponding latches in a bidirectional ring bus, the method comprising:
generating a plurality of clock signals, wherein each of the clock signals is phase-shifted with respect to the remainder of the clock signals;
providing each of the clock signals to a different one of the digital circuit components; and
clocking data into the latch corresponding to one of the digital circuit components based on the clock signal provided to the digital circuit component;
wherein the clock signals are provided to the digital circuit components in a manner that causes non-adjacent ones of the digital circuit components to be fired consecutively.

10. The method of claim 9, further comprising scheduling one or more data transfers on the bidirectional ring bus based at least in part on data transfer speeds associated with clockwise and counterclockwise data paths of the bidirectional ring bus.

11. The method of claim 9, further comprising selectively varying the phase of each of the clock signals.

12. The method of claim 9, further comprising selectively gating each of the clock signals and providing the selectively gated clock signals to the latches.

13. The method of claim 12, further comprising performing the selective gating of the clock signals in a plurality of controllers, wherein each controller is associated with a corresponding one of the digital circuit components.

* * * * *